(12) United States Patent
Rober et al.

(10) Patent No.: US 8,740,999 B2
(45) Date of Patent: Jun. 3, 2014

(54) METHOD AND APPARATUS FOR FUEL CELL STACK ASSEMBLY

(75) Inventors: Kevin B. Rober, Washington, MI (US); Gary L. Jones, Farmington Hills, MI (US); Yhu-Tin Lin, Rochester Hills, MI (US); James W. Wells, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 31 days.

(21) Appl. No.: 13/535,818

(22) Filed: Jun. 28, 2012

(65) Prior Publication Data

US 2012/0260498 A1 Oct. 18, 2012

Related U.S. Application Data

(62) Division of application No. 12/189,231, filed on Aug. 11, 2008, now Pat. No. 8,236,067.

(51) Int. Cl.
*H01M 4/82* (2006.01)

(52) U.S. Cl.
USPC ............ 29/623.1; 29/2; 29/730; 29/763

(58) Field of Classification Search
USPC .................................................. 29/623
See application file for complete search history.

(56) References Cited

U.S. PATENT DOCUMENTS

| | | | |
|---|---|---|---|
| 2002/0068212 A1 | 6/2002 | Osenar et al. | |
| 2006/0051651 A1* | 3/2006 | Rock et al. | 429/34 |
| 2007/0104992 A1* | 5/2007 | Tsai et al. | 429/32 |

\* cited by examiner

*Primary Examiner* — Barbara Gilliam
*Assistant Examiner* — Gary Harris
(74) *Attorney, Agent, or Firm* — Fraser Clemens Martin & Miller LLC; J. Douglas Miller

(57) ABSTRACT

A method and apparatus for assembling a fuel cell stack is disclosed, wherein the apparatus includes a plurality of dunnage cassettes adapted to cooperate with a plurality of containers, a fixture, and an assembly device to simultaneously assemble a plurality of membrane electrode assemblies together with a plurality of bipolar plates.

20 Claims, 7 Drawing Sheets

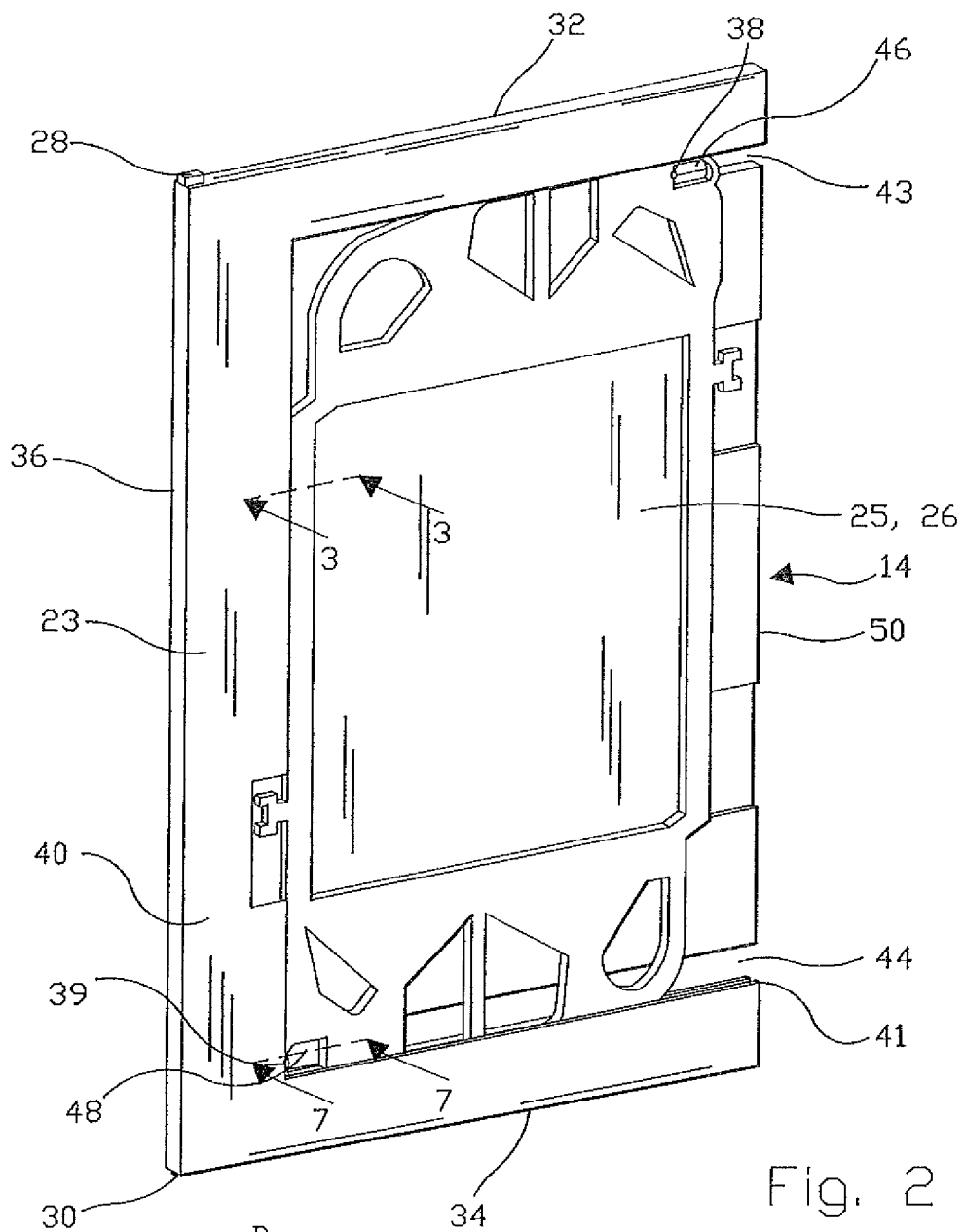
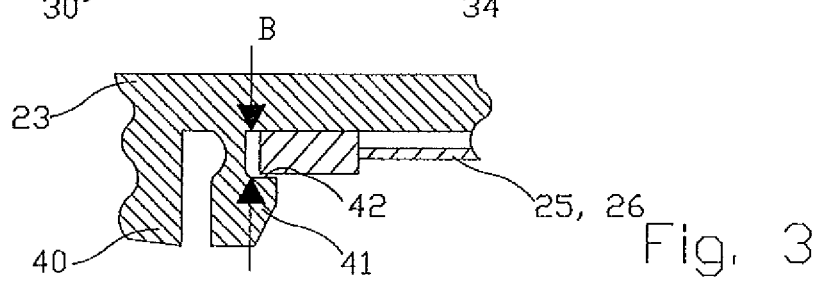
Fig. 2
Fig. 3

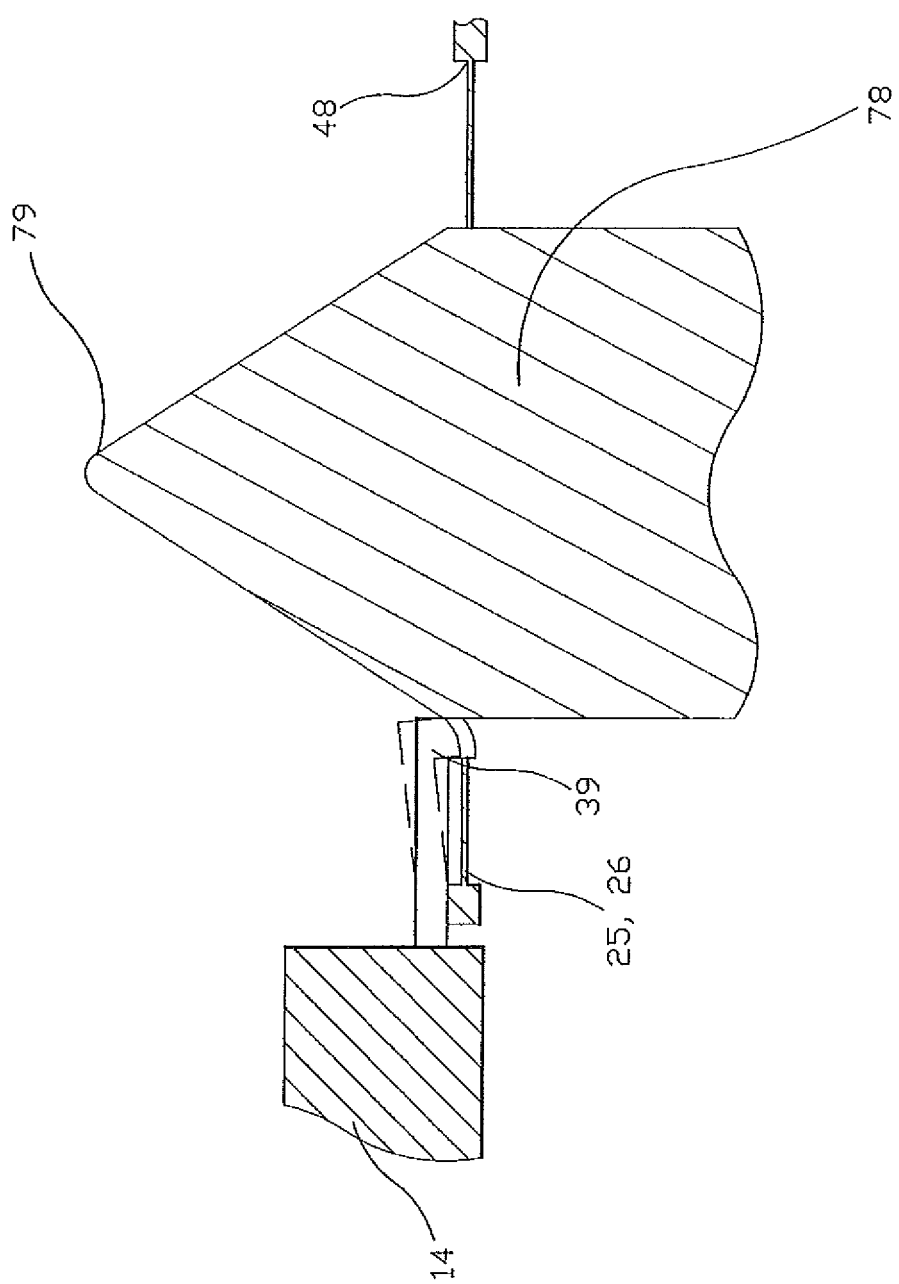

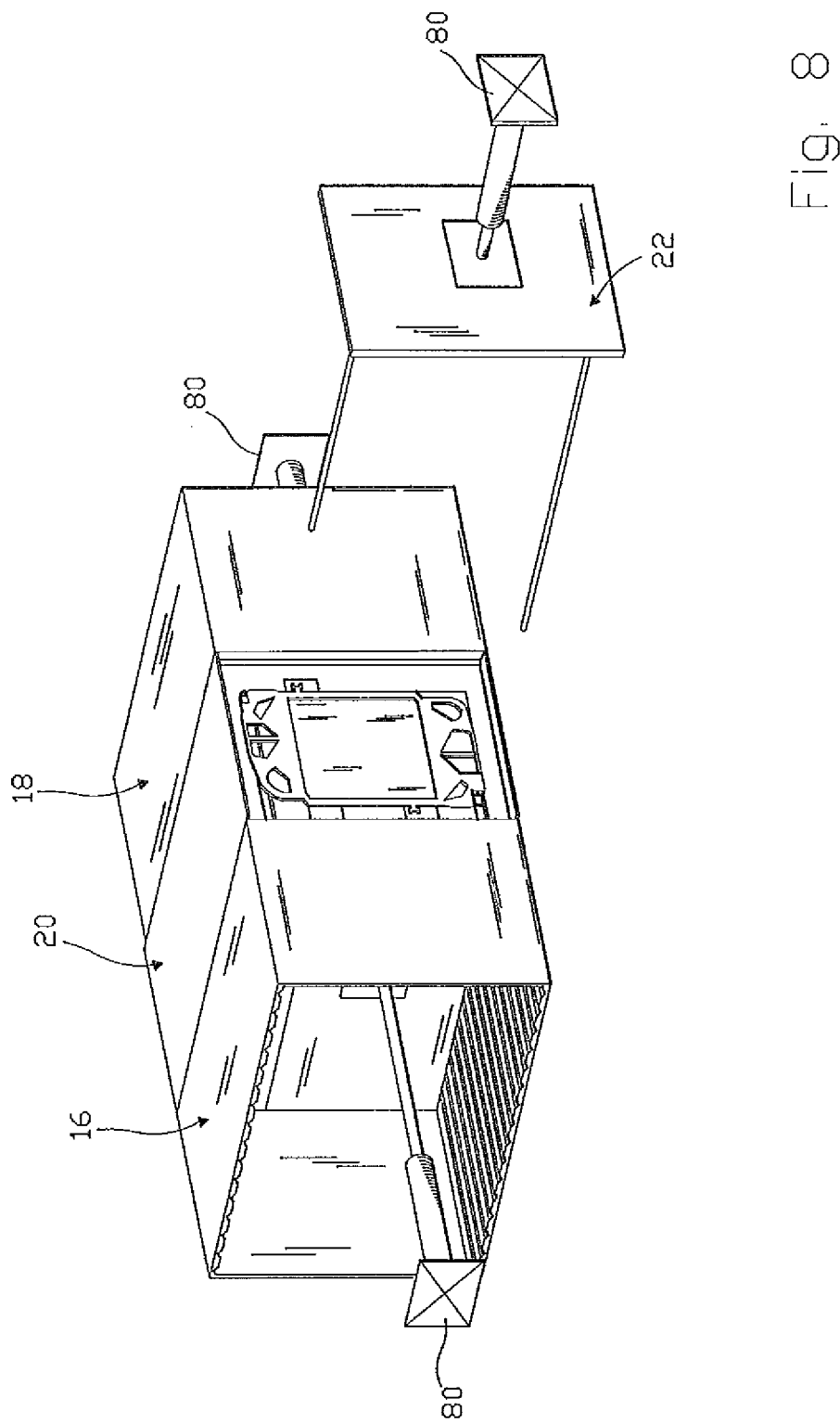

METHOD AND APPARATUS FOR FUEL CELL STACK ASSEMBLY

CROSS-REFERENCE TO RELATED APPLICATION

This application is a divisional of U.S. patent application Ser. No. 12/189,231 filed Aug. 11, 2008, the entire disclosure of which is hereby incorporated herein by reference

FIELD OF THE INVENTION

This invention relates to a method of assembling a fuel cell stack. More particularly, the invention is directed to a modular production method, scalable from a low volume to a high volume production, and an apparatus for assembling a plurality of bipolar plates together with a plurality of membrane electrode assemblies.

BACKGROUND SUMMARY

Fuel cell systems are increasingly being used as a power source in a wide variety of applications. Fuel cell systems have been proposed for use in power consumers such as vehicles as a replacement for internal combustion engines, for example. Fuel cells may also be used as stationary electric power plants in buildings and residences, as portable power in video cameras, computers, and the like. Typically, the fuel cells generate electricity used to charge batteries or to provide power for an electric motor.

Fuel cells are electrochemical devices which directly combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example. The term "fuel cell" is typically used to refer to either a single cell or a plurality of cells depending upon the context in which it is used. The plurality of cells is typically bundled together and arranged to form a stack with the plurality of cells commonly arranged in electrical series. Since single fuel cells can be assembled into stacks of varying sizes, systems can be designed to produce a desired energy output level providing flexibility of design for different applications.

Different fuel cell types can be provided such as phosphoric acid, alkaline, molten carbonate, solid oxide, and proton exchange membrane (PEM), for example. The basic components of a PEM-type fuel cell are two electrodes separated by a polymer membrane electrolyte. Each electrode is coated on one side with a thin catalyst layer. The electrodes, catalyst, and membrane together form a membrane electrode assembly (MEA).

In a typical PEM-type fuel cell, the MEA is sandwiched between "anode" and "cathode" diffusion mediums (hereinafter "DM's") or diffusion layers that are formed from a resilient, conductive, and gas permeable material such as carbon fabric or paper. The DM's serve as the primary current collectors for the anode and cathode as well as provide mechanical support for the MEA. The DM's and MEA, collectively referred to as MEA hereinafter, are pressed between a pair of electronically conductive plates such as bipolar plates, for example, which serve as secondary current collectors for collecting the current from the primary current collectors.

Both of the MEA and the bipolar plate are flexibly thin, approximately less than 1.0 mm, and extremely delicate with special coatings and/or fluid channels. As such, each MEA and bipolar plate is individually packaged with a protective separator to militate against damage thereto during shipping. Accordingly, conventional assembly requires that each MEA and bipolar plate be removed and de-stacked from the individual packages and then re-stacked with either a manual or an automated pick-and-place means. The de-stacking and re-stacking operations, in addition to the delicate nature and limited handling area of the MEA and the bipolar plates, result in a slow assembly process and/or expensive tooling. Furthermore, packing and disposing of the protective separators adds time and cost to the manufacturing cycle.

It would be desirable to develop a modular production method, scalable from a low volume to a high volume production, and produce an apparatus for assembling the MEA and the bipolar plates for a fuel cell stack wherein a cost thereof is minimized and an efficiency thereof is maximized.

SUMMARY OF THE INVENTION

According to the present invention, a modular production method, scalable from a low volume to a high volume production, and an apparatus for assembling the MEA and the bipolar plates for a fuel cell stack wherein a cost thereof is minimized and an efficiency thereof is maximized, has surprisingly been discovered.

In one embodiment, the method for assembling a fuel cell stack comprises the steps of providing a plurality of dunnage cassettes adapted to receive one of a membrane electrode assembly and a bipolar plate therein; providing a plurality of containers adapted to receive the dunnage cassettes therein; providing a fixture adapted to receive the dunnage cassettes therein; providing an assembly device having a plurality of locating rods disposed thereon, the locating rods adapted to assemble at least one membrane electrode assembly together with at least one bipolar plate; disposing the at least one membrane electrode assembly into the dunnage cassettes; disposing the at least one bipolar plate into the dunnage cassettes; inserting the dunnage cassettes into the containers; disposing the containers adjacent opposing sides of the fixture; causing the dunnage cassettes to slide from the containers into the fixture; causing the locating rods of the assembly device to extend through the dunnage cassettes; and causing the dunnage cassettes and the containers to retract from the fixture having the at least one membrane electrode assembly and the at least one bipolar plate remain on the assembly device.

In another embodiment, the method for assembling a fuel cell stack comprises the steps of providing at least one membrane electrode assembly; providing at least one bipolar plate; providing a plurality of dunnage cassettes including at least one tab and at least one of a raised portion, at least one holding clip, and a retaining lip formed thereon, wherein the dunnage cassettes are adapted to receive one of the at least one membrane electrode assembly and the at least one bipolar plate therein, the dunnage cassettes further including at least one slot formed therein; providing a plurality of containers having a plurality of channels formed therein, the channels adapted to receive the dunnage cassettes therein, wherein one end of each of the channels includes a stop formed therein; providing a fixture having a plurality of channels formed therein, the channels adapted to receive the dunnage cassettes therein; providing an assembly device having a plurality of locating rods disposed thereon, the locating rods adapted to assemble the at least one membrane electrode assembly together with the at least one bipolar plate; disposing the at least one membrane electrode assembly into the dunnage cassettes; disposing the at least one bipolar plate into the dunnage cassettes; inserting the dunnage cassettes into the channels of the containers; disposing the containers adjacent opposing sides of the fixture, wherein at least one of the containers is offset a predetermined distance from an edge of the fixture; causing the dunnage cassettes to slide from the containers into the channels of the fixture; causing the locating rods of the assembly device to extend through the dunnage cassettes; causing a nose portion of the locating rods to release the at least one holding clip of the dunnage cassettes; and causing the dunnage cassettes and the containers to retract from the fixture having the at least one membrane electrode assembly and the at least one bipolar plate remain on the assembly device.

In one embodiment, the apparatus for assembling a fuel cell stack comprises a plurality of dunnage cassettes adapted to receive one of a membrane electrode assembly and a bipolar plate therein, the dunnage cassettes including at least one slot formed therein; a plurality of containers having a plurality of channels formed therein, the channels adapted to receive the dunnage cassettes therein; a fixture having a plurality of channels formed therein, the channels adapted to receive the dunnage cassettes therein, wherein the channels of the containers are substantially aligned with alternating channels of the fixture; and an assembly device having a plurality of locating rods disposed thereon, the locating rods adapted to assemble the at least one membrane electrode assembly together with the at least one bipolar plate, wherein the at least one slot of the dunnage cassettes permit the dunnage cassettes to be removed from the locating rods.

DESCRIPTION OF THE DRAWINGS

FIG. 2 is an enlarged side perspective view of a dunnage cassette for the apparatus for assembling the fuel cell stack illustrated in FIG. 1 having one of an MEA and a bipolar plate disposed therein;

FIG. 3 is an enlarged fragmentary top cross-sectional view of the dunnage cassette illustrated in FIG. 2, wherein the dunnage cassette includes a raised portion and a retaining lip formed thereon;

FIG. 7 is an enlarged fragmentary top cross-sectional view of the dunnage cassette illustrated in FIG. 2, wherein a locating rod of an assembly device is releasing a holding clip of the dunnage cassette from one of an MEA and a bipolar plate; and FIG. 8 is a partially exploded perspective view of the apparatus illustrated in FIGS. 1 and 6, wherein an actuator has caused the MEA and bipolar plates to be disposed into a fixture.

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
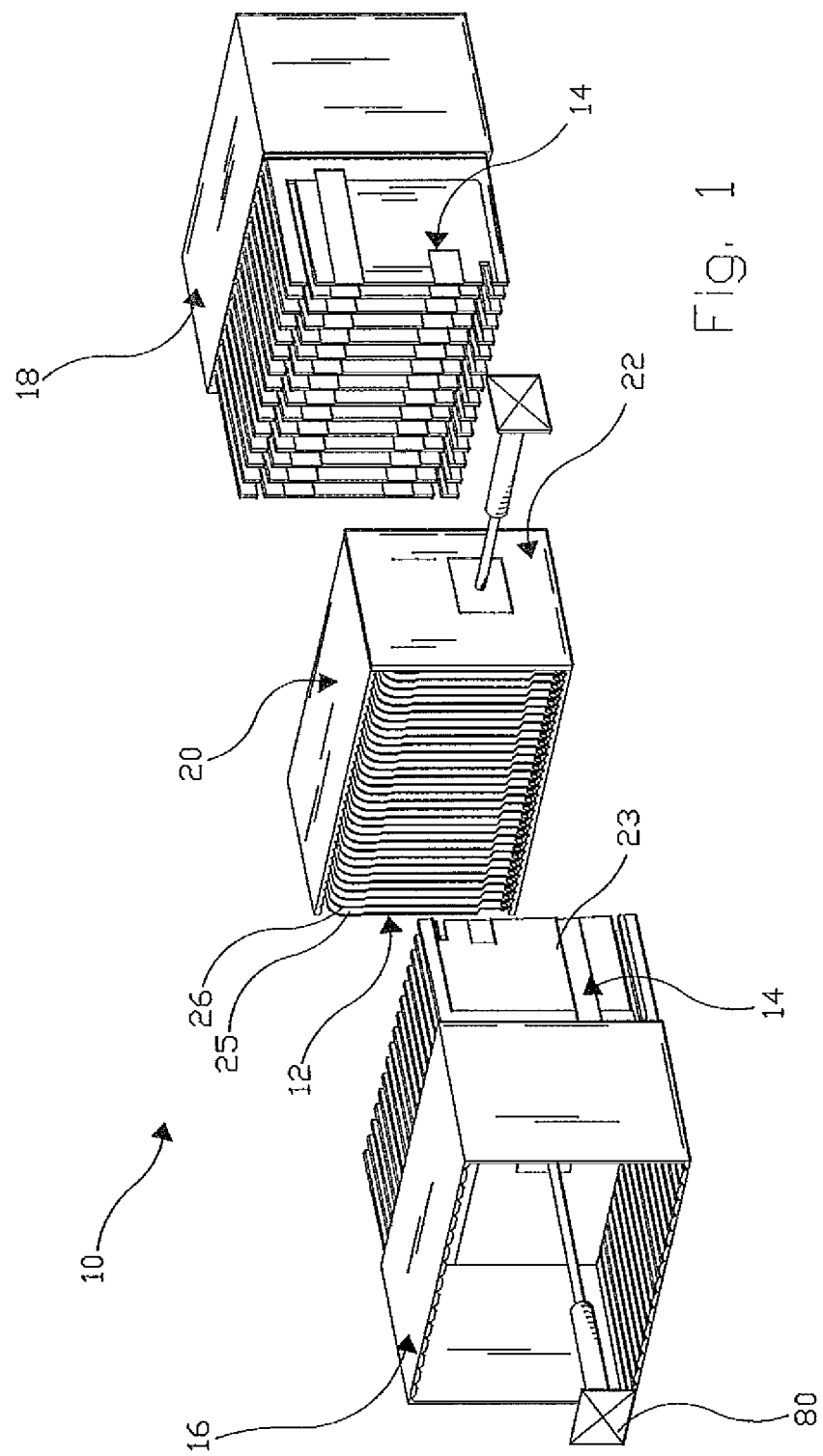
FIG. 1 is an exploded perspective view of an apparatus for assembling a fuel cell stack according to an embodiment of the invention.

FIG. 1 shows an apparatus 10 for assembling a fuel cell stack 12 according to an embodiment of the invention. The apparatus 10 includes a plurality of dunnage cassettes 14, a pair of containers 16, 18, a fixture 20, and an assembly device 22. Each of the dunnage cassettes 14 shown is a tray 23 adapted to removably receive one of an MEA 25 and a bipolar plate 26 therein. It is understood that each of the dunnage cassettes 14 can also be a "clam shell" package including the tray 23 having a cover pivotally attached thereto. The dunnage cassettes 14 are generally rectangular in shape, although it is understood that the dunnage cassettes 14 can have any size and shape as desired. As illustrated in FIG. 2, a first tab 28 is formed on an upper edge 32 of the tray 23 adjacent an outer edge 36 thereof. A second tab 30 is formed on a lower edge 34 of the tray 23 adjacent the outer edge 36 thereof. While the edges 32, 34, have been referred to as upper and lower, respectively, it is understood that the tray 23 may be oriented in a variety of locations, wherein the edges 32, 34 may be in different positions.

The tray 23 may also include at least one of a pair of holding clips 38, 39, a raised portion 40, and a retaining lip 41 formed thereon. Additional or fewer clips may be disposed on the tray 23, if desired. In the embodiment shown, the clips 38, 39 are disposed on opposing corners of the tray 23, wherein the clips 38, 39 are in a substantially diagonal relation to each other. It is understood that the clips 38, 39 can be disposed elsewhere on the tray 23 as desired. It is further understood that the clips 38, 39 can have any shape as desired. The clips 38, 39 are adapted to extend though respective apertures 46, 48 formed in the MEA 25 and the bipolar plate 26 to retain the MEA 25 and the bipolar plate 26 in the dunnage cassettes 14. The raised portion 40 is formed adjacent the edges 32, 34, 36 of the tray 23 creating a recessed area. The raised portion 40 is adapted to locate and retain the MEA 25 and the bipolar plate 26 in the dunnage cassettes 14. In the embodiment shown in FIG. 3, the retaining lip 41 is formed adjacent the raised portion 40 of the tray 23 and extends laterally outwardly from the tray 23. It is understood that the retaining lip 41 can be formed elsewhere on the tray 23 as desired such as adjacent the edges 32, 34, 36 of the tray 23, for example. It is further understood that the retaining lip 41 can have any shape as desired. The retaining lip 41 includes a shoulder 42 formed therein. A gap B is formed between an inner surface of the tray 23 and the shoulder 42 of the retaining lip 41 to receive the MEA 25 and the bipolar plate 26 therein. The retaining lip 41 is adapted to locate and retain the MEA 25 and the bipolar plate 26 in the dunnage cassettes 14.

A pair of slots 43, 44 may also be formed in the tray 23. Additional or fewer slots may be formed in the tray 23, if desired. The slots 43, 44 are formed adjacent opposing edges 32, 34 of the tray 23. The slot 43 is formed in an upper portion of the tray 23, extending inwardly from an outer edge 50 thereof to the clip 38. The slot 44 is formed in a lower portion of the tray 23, extending inwardly from the outer edge 50 thereof to the clip 39. It is understood that the slots 43, 44 can be formed elsewhere in the tray 23 as desired.

Figure 4:
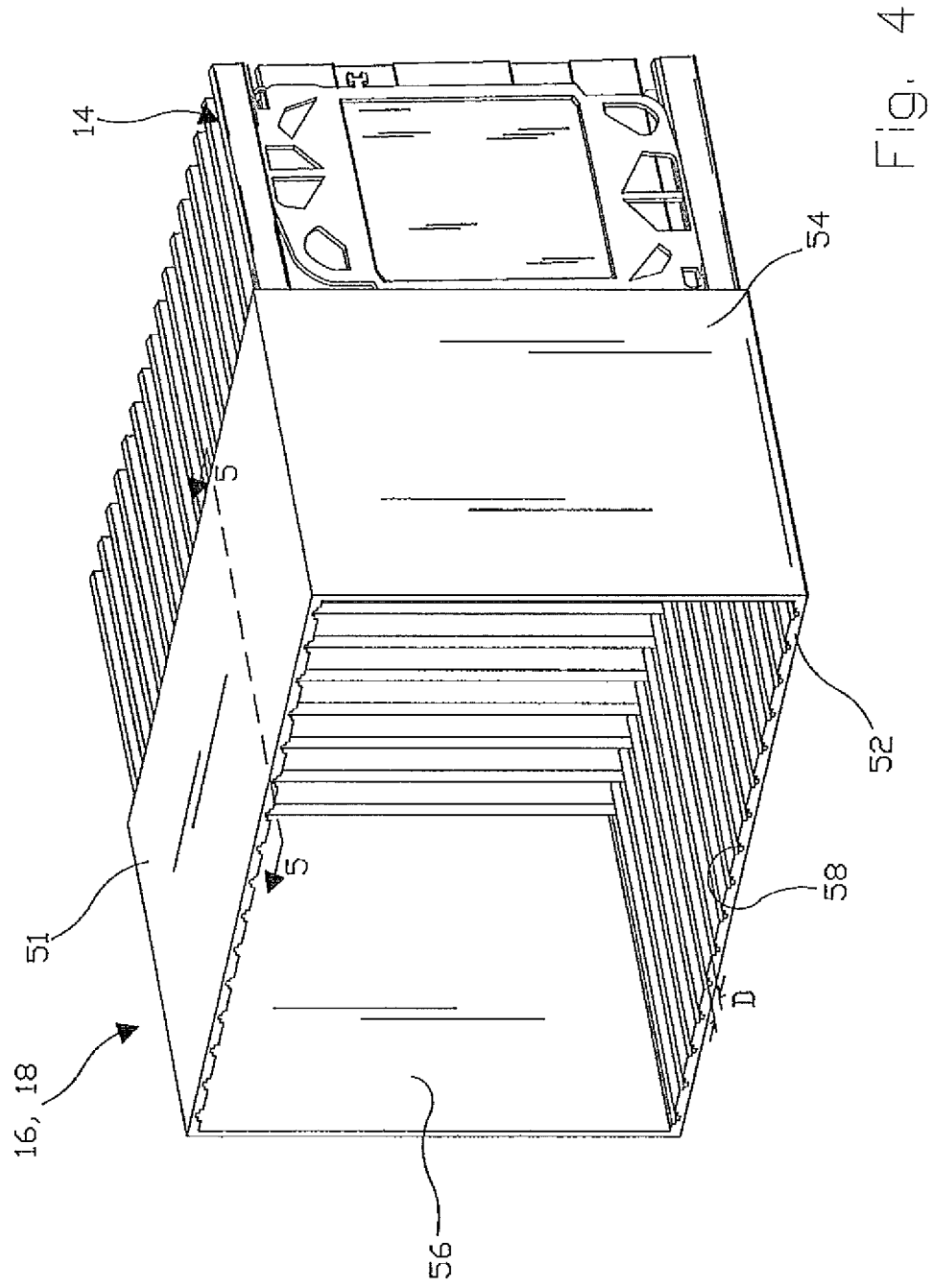
FIG. 4 is a side perspective view of a container for the apparatus for assembling the fuel cell stack illustrated in FIG. 1 having a plurality of the dunnage cassettes disposed therein.
Figure 5:
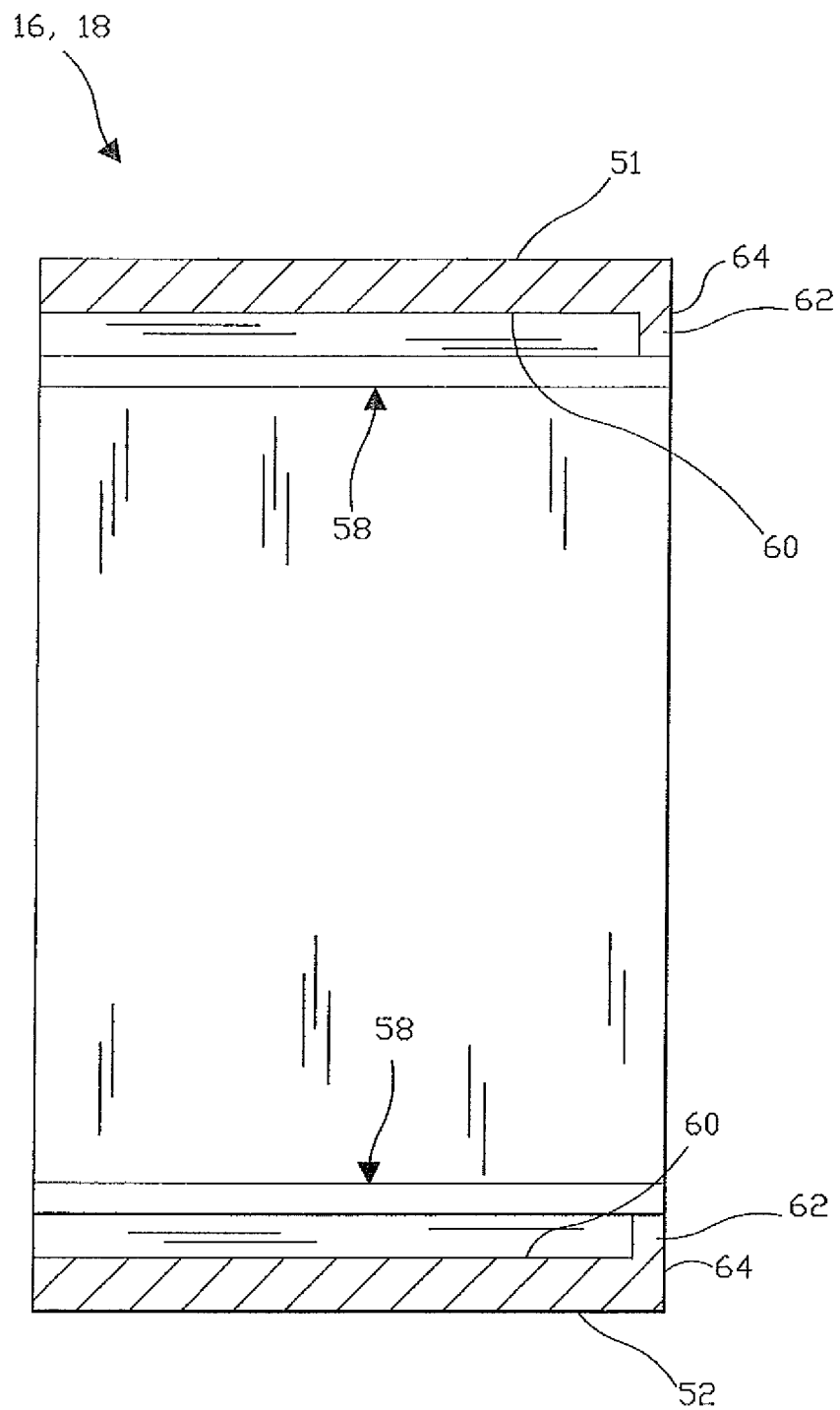
FIG. 5 is a cross-sectional view of the container illustrated in FIG. 4.

As illustrated in FIG. 4, the dunnage cassettes 14 are adapted to be slideably received in the containers 16, 18. The containers 16, 18 are box-like having an upper section 51, a lower section 52, and opposing side sections 54, 56. It is understood that the containers 16, 18 can have any size and shape as desired. A front and a rear of each of the containers 16, 18 are open to receive the dunnage cassettes 14 therein and to permit the dunnage cassettes 14 to be received into the fixture 20. It is understood that the containers 16, 18 can be produced from any conventional material such as a polymer and a metal, for example. The dunnage cassettes 14 are disposed in a plurality of spaced-apart channels 58 formed in each of the containers 16, 18. The channels 58 are formed in the upper section 51 and the lower section 52 of the containers 16, 18 and spaced at a predetermined distance D. In the embodiment shown, the predetermined distance D is at least a width of one of the dunnage cassettes 14. It is understood that the predetermined distance D can be any distance as desired. As shown in FIG. 5, each of the channels 58 includes a stepped portion 60 adapted to receive the tabs 28, 30 therein. A stop 62 is formed in the stepped portion 60 at an end 64 of each of the channels 58. The stop 62 cooperates with the tabs 28, 30 to retain the dunnage cassettes 14 within the containers 16, 18 and cause the dunnage cassettes 14 to be extracted from the fixture 20 by the containers 16, 18 during operation of the apparatus 10.

Figure 6:
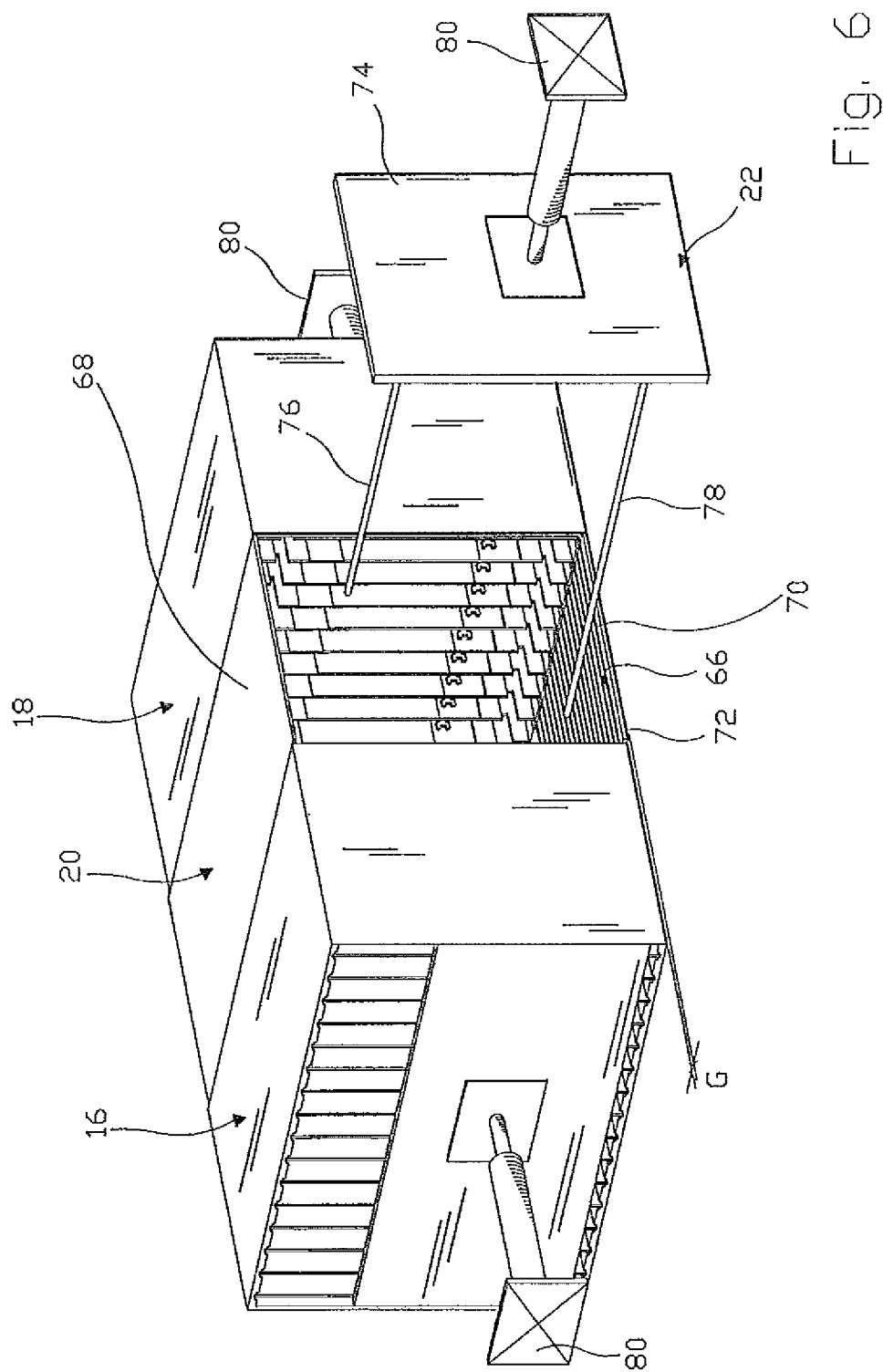
FIG. 6 is a partially exploded perspective view of the apparatus illustrated in FIG. 1.

Referring to FIG. 6, the fixture 20 includes a first plate 66 and a second plate 68. Each of the first plate 66 and the second plate 68 includes a plurality of spaced-apart channels 70 formed therein. The channels 70 are formed in the plates 66, 68 in a substantially parallel relation to an edge 72 of the fixture 20. The channels 70 are adapted to receive the dunnage cassettes 14 from the containers 16, 18 therein.

The assembly device 22 is disposed adjacent the fixture 20. In the embodiment shown, the assembly device 22 includes an end plate 74 having a first locating rod 76 and a second locating rod 78 laterally extending therefrom. Additional locating rods may be disposed on the end plate 74 if desired. The end plate 74 is generally rectangular in shape and adapted to abut the fixture 20 during operation of the apparatus 10. It is understood that the end plate 74 can have other shapes as desired. The locating rods 76, 78 are disposed adjacent opposing corners of the end plate 74, wherein the locating rods 76, 78 are in a substantially diagonal relation to each other. It is understood that the locating rods 76, 78 can be disposed elsewhere on the end plate 74 as desired. As illustrated in FIG. 7, the locating rods 76, 78 are adapted to extend though the respective apertures 46, 48 formed in the MEA 25 and the bipolar plate 26. A nose portion 79 of the locating rods 76, 78 contacts and releases the clips 38, 39 of the dunnage cassettes 14 from each of the MEA 25 and the bipolar plate 26, as indicated in FIG. 7 by the dashed lines.

It is understood that the apparatus 10 can further include at least one actuator 80, as shown in FIGS. 1, 6, and 8, and a compression device (not shown). The at least one actuator 80 is adapted to cause the dunnage cassettes 14 to be received into the fixture 20 and the assembly device 22 to abut the fixture 20. The compression device is adapted to properly bundle the MEAs 25 and the bipolar plates 26 into the fuel cell stack 12 and complete the assembly process.

In operation, the tray 23 of each of the dunnage cassettes 14 receives one of the MEA 25 and the bipolar plate 26 therein. As shown in FIGS. 2 and 3, at least one of the holding clips 38, 39, the raised portion 40, and the retaining lip 41 of each tray 23 retain the MEA 25 and the bipolar plate 26 therein to militate against damage thereto. Thereafter, as illustrated in FIG. 4, the dunnage cassettes 14 having the MEAs 25 disposed therein are then slideably received into the container 16, and the dunnage cassettes 14 having the bipolar plates 26 disposed therein are slideably received into the container 18. It is understood that the dunnage cassettes 14 having the MEAs 25 disposed therein can be disposed into the container 18 and the dunnage cassettes 14 having the bipolar plates 26 disposed therein can be disposed into the container 16, if desired. Accordingly, the tabs 28, 30 of each of the dunnage cassettes 14 are disposed in the stepped portion 60 of each of the channels 58.

The containers 16, 18 are then disposed adjacent opposing sides of the fixture 20. As shown in FIG. 6, the container 16 is offset a predetermined distance G from the edge 72 of the fixture 20, and the container 18 is offset the predetermined distance G from the rear of the fixture 20. The predetermined distance G illustrated is approximately the width of one of the dunnage cassettes 14 to cause the channels 58 of the containers 16, 18 to substantially align with alternate channels 70 of the fixture 20, although it is understood that the predetermined distance G can be any distance as desired. As shown in FIG. 8, the dunnage cassettes 14 of the containers 16, 18 are then caused by the at least one actuator 80 to slide into the fixture 20, until the tabs 28, 30 formed thereon abut the stop 62 formed in each end 64 of the channels 58. Accordingly, the MEAs 25 and the bipolar plates 26 are disposed in the fixture 20 in an interleaved pattern having the apertures 46, 48 substantially aligned.

Thereafter, as shown in FIG. 1, the assembly device 22 is caused by the at least one actuator 80 to abut the edge 72 of the fixture 20. Accordingly, the locating rods 76, 78 of the assembly device 22 are caused to extend through the respective apertures 46, 48 of the MEAs 25 and the bipolar plates 26. In the embodiment shown, the nose portion 79 of each of the locating rods 76, 78 substantially contacts the clips 38, 39 to release the MEAs 25 and the bipolar plates 26 from the dunnage cassettes 14. Once the locating rods 76, 78 have released the MEAs 25 and the bipolar plates 26 from the dunnage cassettes 14, the at least one actuator 80 and the containers 16, 18 are caused to retract from the fixture 20. When the containers 16, 18 retract, the stop 62 formed in the end 64 of each of the channels 58 engages the tabs 28, 30 to also cause the dunnage cassettes 14 to retract from the fixture 20. As the dunnage cassettes 14 retract, the locating rods 76, 78 slide along the respective slots 43, 44 formed therein and the MEAs 25 and the bipolar plates 26 are removed from the recessed area of the tray 23 and released from the retaining lip 41 thereof. Once the dunnage cassettes 14 are fully retracted from the fixture 20, the compression device assembles the MEAs 25 and the bipolar plates 26 disposed on the locating rods 76, 78 of the assembly device 22 into the fuel cell stack 12 and completes the assembly operation.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. An apparatus for assembling a fuel cell stack comprising:
 a plurality of dunnage cassettes releasably receiving one of a membrane electrode assembly and a bipolar plate therein, each of the dunnage cassettes including a raised portion formed adjacent at least a portion of the edges of the dunnage cassettes to form a recessed area, the recessed area receiving the one of the membrane electrode assembly and the bipolar plate, the raised portion including at least one slot formed therein for locating and retaining the one of the membrane electrode assembly and the bipolar plate, each of the dunnage cassettes configured to be slideably received in at least one container of the apparatus.

2. The apparatus according to claim 1, wherein each of the dunnage cassettes includes at least one holding clip configured to locate and retain the one of the membrane electrode assembly and the bipolar plate.

3. The apparatus according to claim 1, wherein each of the dunnage cassettes includes a retaining lip configured to retain the one of the membrane electrode assembly and the bipolar plate.

4. The apparatus according to claim 3, wherein the one of the membrane electrode assembly and the bipolar plate is received in a gap formed between an inner surface of the dunnage cassette and the retaining lip.

5. The apparatus according to claim 1, wherein each of the dunnage cassettes includes at a pair of slots formed therein.

6. The apparatus according to claim 1, wherein at least a portion of the at least one container is open to receive the dunnage cassettes therein and permit the dunnage cassette to be received into a fixture of the apparatus.

7. The apparatus according to claim 1, wherein the dunnage cassettes are disposed in a plurality of spaced-apart channels formed in the at least one container.

8. The apparatus according to claim 7, wherein each of the dunnage cassettes includes a tab which cooperates with a stop formed at an end of the channels of the at least one container to retain the dunnage cassettes therein and cause the dunnage cassettes to be extracted from a fixture of the apparatus.

9. The apparatus according to claim 1, wherein the fixture includes a plurality of spaced-apart channels formed therein.

10. The apparatus according to claim 1, further comprising an assembly device disposed adjacent the fixture of the apparatus.

11. The apparatus according to claim 10, wherein the assembly device includes an end plate having at least one locating rod laterally extending therefrom.

12. The apparatus according to claim 1, further comprising at least one actuator configured to cause the dunnage cassettes to be received into a fixture of the apparatus.

13. The apparatus according to claim 10, further comprising at least one actuator configured to cause the assembly device to abut the fixture of the apparatus.

14. An apparatus for assembling a fuel cell stack comprising:
a fixture having a plurality of channels formed therein, each of the channels configured to receive a dunnage cassette therein, wherein the dunnage cassette releasably receives one of a membrane electrode assembly and a bipolar plate therein, each of the dunnage cassettes including a raised portion formed adjacent at least a portion of the edges of the dunnage cassettes to form a recessed area, the recessed area receiving the one of the membrane electrode assembly and the bipolar plate, the raised portion including at least one slot formed therein for locating and retaining the one of the membrane electrode assembly and the bipolar plate.

15. The apparatus according to claim 14, further comprising an assembly device disposed adjacent the fixture of the apparatus.

16. The apparatus according to claim 15, wherein the assembly device is configured to assemble the membrane electrode assemblies together with the bipolar plates.

17. An apparatus for assembling a fuel cell stack comprising:
a plurality of dunnage cassettes configured to receive one of a membrane electrode assembly and a bipolar plate therein, each of the dunnage cassettes including a raised portion formed adjacent at least a portion of the edges of the dunnage cassettes to form a recessed area, the recessed area for receiving the one of the membrane electrode assembly and the bipolar plate, the raised portion including at least one slot formed therein for locating and retaining the one of the membrane electrode assembly and the bipolar plate;
a plurality of containers having a plurality of channels formed therein, each of the channels configured to receive one of the dunnage cassettes therein;
a fixture having a plurality of channels formed therein, each of the channels configured to receive one of the dunnage cassettes therein, wherein the channels of the containers are substantially aligned with alternating channels of the fixture; and
an assembly device having at least one locating rod disposed thereon, the at least one locating rod configured to assemble the at least one membrane electrode assembly together with the at least one bipolar plate.

18. The apparatus according to claim 17, wherein the at least one locating rod of the assembly device is configured to release the dunnage cassettes from the containers.

19. The apparatus according to claim 1, further comprising a fixture configured to receive the dunnage cassettes therein.

20. The apparatus according to claim 1, wherein the raised portion of each of the dunnage cassettes is U-shaped.

\* \* \* \* \*